(12) United States Patent
Castle et al.

(10) Patent No.: US 6,193,498 B1
(45) Date of Patent: Feb. 27, 2001

(54) EXTENDED LIFE DIE PLATE

(75) Inventors: Amy E. Castle, Fall Branch; Mark A. Thrasher, Kingsport; Shane K. Kirk, Church Hill, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/258,316

(22) Filed: Feb. 26, 1999

(51) Int. Cl.[7] .................................................. B29B 9/06
(52) U.S. Cl. ................................ 425/382.2; 425/382 R; 425/464
(58) Field of Search ........................... 429/382 R, 382.2, 429/464, 470, 310, 311, 313, 72.2

(56) References Cited

U.S. PATENT DOCUMENTS

| | | |
|---|---|---|
| 756,259 | 4/1904 | Malone et al. . |
| 2,408,713 | 10/1946 | Webb ................................... 425/464 |
| 2,798,252 * | 7/1957 | Cummings, Jr. ........................... 18/8 |
| 3,153,392 | 10/1964 | Verona ............................... 425/382 R |
| 3,361,860 | 1/1968 | Fassbener .............................. 264/188 |
| 4,088,433 * | 5/1978 | Simpson ............................... 425/464 |
| 4,111,632 | 9/1978 | Leaver ................................ 425/392 |
| 4,465,452 * | 8/1984 | Masuzawa ............................ 425/308 |
| 5,567,493 | 10/1996 | Imai et al. ........................... 428/36.9 |

* cited by examiner

*Primary Examiner*—Harold Pyon
*Assistant Examiner*—Joseph S Del Sole
(74) *Attorney, Agent, or Firm*—Michael J. Blake, Esq.; Harry J. Gwinnell

(57) ABSTRACT

A die plate is shown suitable for extruding a viscous material into a convenient form for the preparation of small pellets or particles. The die plate includes solid support portions and perforated portions. Each perforated portion of the die plate includes a major portion of holes through the die plate spaced from each other by a first distance and a transition portion separating the major portion from the solid support portions, with the transition portions having holes spaced from each other by a distance that is greater than the first distances.

19 Claims, 2 Drawing Sheets

EXTENDED LIFE DIE PLATE

BACKGROUND OF THE INVENTION

1. Field of the Invention

This invention pertains to a die plate for use in extruding a viscous material. More particularly, a die plate is shown that permits rapid extrusion of material and that has an extended service life.

2. Background of the Invention

Existing die plates used in the extrusion of viscous materials are formed from flat metal plates with a multiplicity of holes drilled through the plates. The holes through the plates are of substantially equal diameter and of substantially uniform diameter throughout their lengths. The holes through existing extrusion die plates are also spaced parallel to each other and substantially equal distance from each other.

A common problem with existing extrusion die plates is that the area around the perimeter of a group of holes through the plate tends to rip or tear away from the solid portion of the plate under the pressure of the extruder. The extruder generally forces a viscous or pasty material through the holes in the extruder die plate to form a plurality of cylinders of the viscous material that may be broken up into small particles for the preparation of solid granules.

The thickness of the extruding die plate controls the length of the holes through the die plate, which constitutes one of the factors affecting the power consumed by the extruder. The thickness of the die plate also affects the strength of the die plate, and hence resistance to failure by tearing along the boundary between the perforated section of the die plate and the solid support portion of the die plate. A change in the thickness of the die plate, and therefore in the length of the holes through the die plate, presents problems because it affects not only the pressure required to extrude the viscous materials through the die plate but also the rheology or flow characteristics of the material extruding through the die plate. The feed rate at which the viscous material is extruded through the die plate can also be changed in order to affect the pressure exerted on the die plate. A problem with reducing the feed rate in order to lower the back pressure on the die is a resultant lower production rate and reduced economy. The characteristics of the material being extruded, such as viscosity, can also be changed in an attempt to reduce the stress on the die plate during extrusion. Changes to the material characteristics of the extrusion materials is generally either impossible or undesirable as a result of the required characteristics of the end product.

SUMMARY OF THE INVENTION

In view of the foregoing problems with conventional die plates, the die plate according to one aspect of the present invention was developed to permit rapid extrusion of a solid viscous material under pressure while maintaining an extended service life of the die plate as compared with conventional die plates.

A die plate according to an aspect of the present invention includes a solid support area and a perforated area that borders on the solid area. The perforated area includes a main portion having holes through the die plate that are spaced from each other by first distances, and a transitional area separating the main portion from the solid support area and having holes through the die plate that are spaced from each other by second distances greater than the first distances.

The solid supporting section of the die plate separates the perforated portion of the die plate into a plurality of smaller perforated extruding sections. Each of the smaller perforated extruding sections has a major portion of holes through the die plate that are spaced from each other by first distances and a transition portion of holes through the die plate that are spaced from each other by second distances greater than the first distances. The transition portions surround the major portions in each smaller perforated extruding section and separate the major portions from the solid supporting section.

The solid supporting section of the die plate is shaped in accordance with the structure of the extruder used to force viscous material through the die plate. A typical extruder screw used for forcing the viscous material through the die plate is a screw-type extruder such as the six inch extruder sold under the trademark "EXTRUD-O-MIX" made by Hosokawa Bepex Corporation of Minneapolis, Minn. The extruder includes a beveled blade that wipes viscous material over the face of the die plate and pushes the material through the holes in the die plate.

The solid support section on the die plate borders perforated areas of the die plate through which the viscous material is extruded. The spacing, and therefore the amount of die plate material between the holes through the die plate in the transitional areas adjacent the solid support section is greater than the amount of material between the holes in a major portion of each perforated area. The increase in the amount of material between holes through the die plate closer to the solid support sections improves the strength of the die plate at the perimeters the perforated areas, thus increasing the service life of the die plate.

DETAILED DESCRIPTION OF THE PREFERRED EMBODIMENTS

Figure 2:
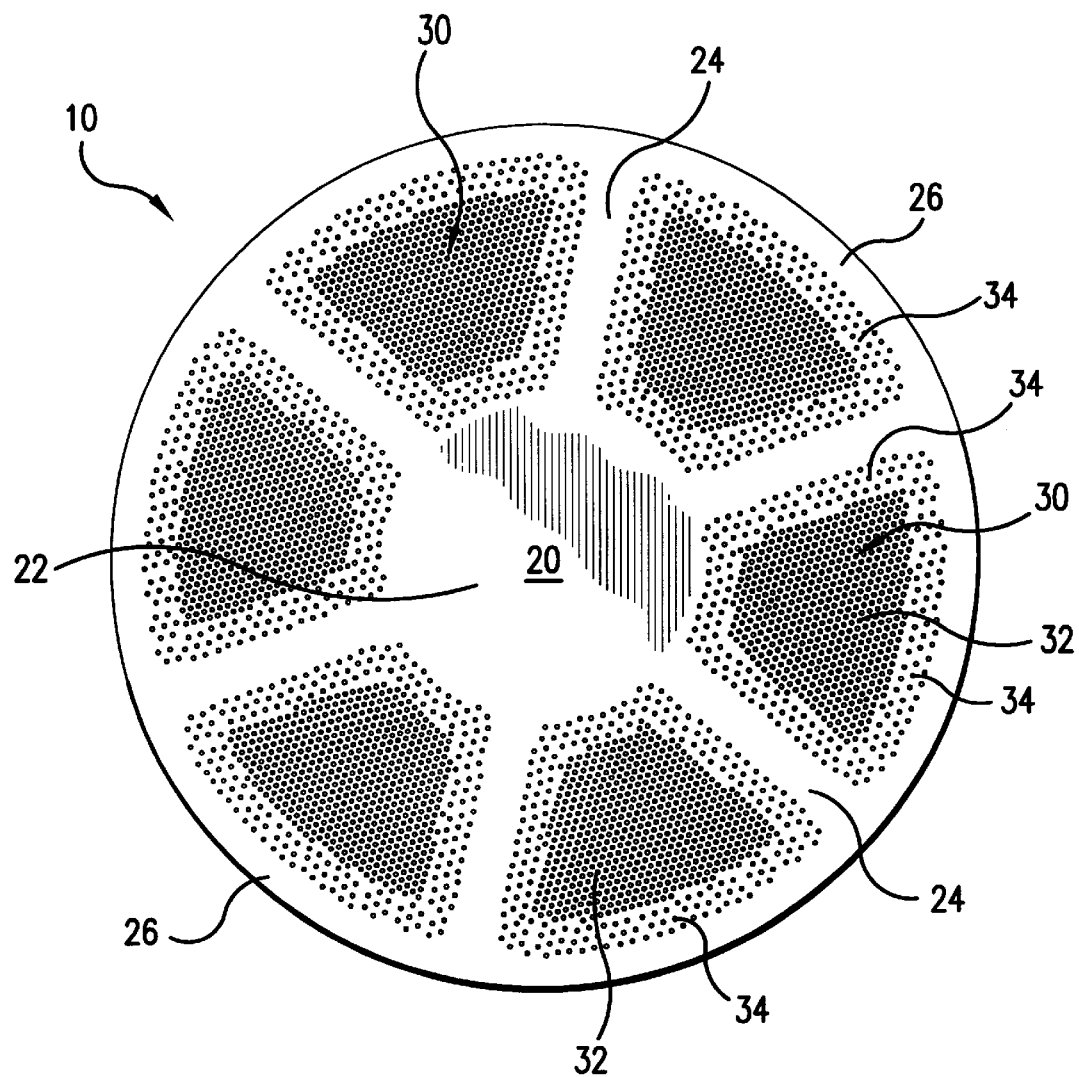
FIG. 2 shows a die plate according to an embodiment of the present invention.

In one embodiment of the present invention, as shown in FIG. 2, a die plate 10 approximately six inches in diameter and approximately 0.04 inch thick includes a solid support section 20 and perforated sections 30. The solid support section 20 includes a center hub 22, radially extending spokes 24 and an outer rim 26. The areas of the die plate 10 defined between the center hub 22, the radially extending spokes 24 and the outer rim 26 of the solid support section constitute the perforated areas 30. Each of the perforated areas 30 includes a major portion 32 of holes through the die plate and a transition portion 34 of holes through the die plate. The transition portions 34 completely separate the major portions 32 from the solid support portions 20.

In the embodiment shown in FIG. 2, the holes through die plate 10 in major portions 32 of perforated areas 30 are 0.7 mm (0.027 inch) in diameter. The holes are shown to be substantially equal distance from each other within each of the major portions 32. The holes within the major portions 32 are spaced from each other approximately 1.0 mm (0.04 inch) center-to-center.

The holes through the die plate 10 in the transition portions 34 of perforated areas 30 are also 0.7 mm (0.027 inch) in diameter. The holes within the transition portions are spaced from each other approximately 1.5 mm (0.06 inch). The transition portions 34 include at least 3 rows of the 0.7 mm (0.027 inch) diameter holes spaced 1.5 mm (0.06 inch) from each other center-to-center extending around the outer periphery of each major portion 32.

Although the embodiment shown in FIG. 2 has holes through the plate in both the major portions and the transition portions of the perforated sections that are substantially equal diameter round holes, a skilled artisan will recognize that the holes could have other shapes. The shape of the holes through the die plate determines the shape of the tubes of extruded material being forced through the die plate. Additionally, the spacing between the holes in the major portions and the transition portions could vary as long as the holes in the transition portions are spaced by greater distances than the holes in the major portions, such that the transition areas have an increased strength and resistance to tearing away from the adjacent solid sections.

In the following examples a conventional extruder die plate was compared to die plates made in accordance with aspects of the invention.

EXAMPLES

In the following examples, intimate mixtures of sodium 4-sulfophenyl-[(1-oxyalkanoyl)amino]hexanoatee (alkanoyl=$C_8$–$C_{10}$), citric acid or sodium citrate dihydrate, linear alkanesulfonate (Ufaryl 85™), and sufficient water to moisten the mix were extruded, using a six inch extruder sold under the trademark "EXTRUD-O-MIX™" (manufactured by Hosokawa Bepex Corporation of Minneapolis, Minn.), to form small pellets.

Examples 1 and 2 use conventional die plates, and example 3 uses a die plate made in accordance with aspects of this invention.

Example 1

Figure 1:
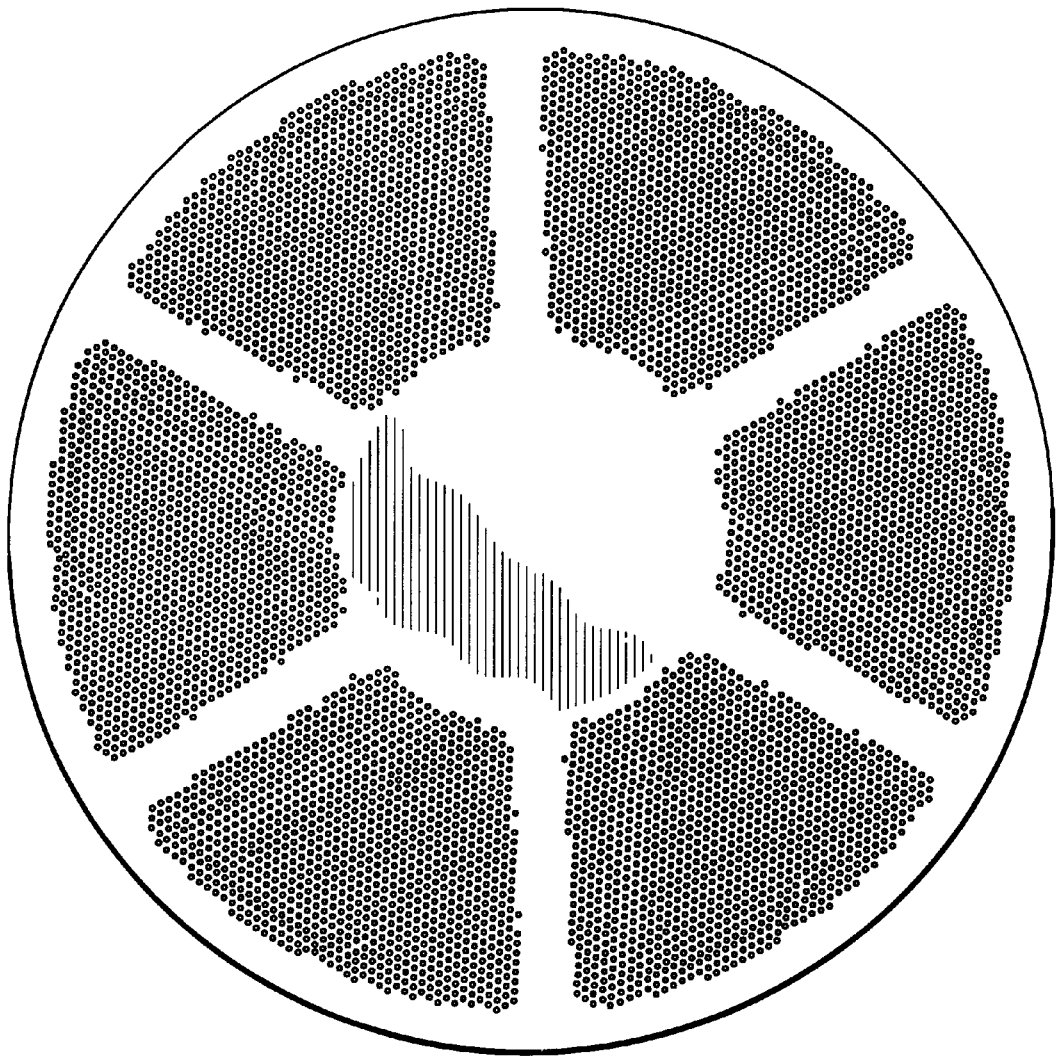
FIG. 1 shows a conventional die plate design with uniformly spaced holes.

A mixture of 123.8 kg of sodium 4-sulfophnyl-[(oxyalkanoyl)amino]hexanoate, 18.9 kg of LAS, and 16.2 kg of citric acid was extruded, using a die plate 0.7 mm (0.027 inch) thick with 50% open area which consisted of 0.7 mm (0.027 inch) holes (FIG. 1). Power drawn by the extruder was measured as the extrusion rate was increased from 226 to 376 kg/hr. The power consumed by the extruder rate was increased gradually from 1.28 to 3.63 kw. When an attempt was made to increase the extrusion rate further, the die failed by ripping of the perforated portion of the die away from the solid portion. It was observed during the run that the water level in the feed mix was not critical.

Example 2

In this example, a slightly thicker die plate 1 mm (0.04 inch) thick was used. The die failed after only 5 min running time, at an extrusion rate of 393 kg/hr. The feed material was the same as in Example 1, except that sodium citrate dihydrate was substituted for citric acid. The power drawn by the extruder at the time the die failed was 4.4 kw. The die failure was the same way as in Example 1.

Example 3

In this example, a die plate as described in this specification and illustrated in FIG. 2 was used. The die plate was 1 mm (0.04 inch) thick and contained 50% open area in which the 0.7 mm (0.027 inch) diameter holes spaced 1.0 mm (0.040 inch) apart from center-to-center were surrounded by holes spaced 1.5 mm (0.06 inch) center-to-center apart. The feed material was the same as that of Example 1.

The extruder operated without interruption and with no die failure, at extrusion rates of 210–250 kg/hr, and at extruder power consumption as high as 7.6 HP (5.7 kw).

It is apparent from comparison of Examples 1 and 2 with Example 3 that die plate "ripping" that occurs with the conventional plate which contains only 0.7 mm holes spaced equidistant is avoided when the die plate of this invention is used. In Example 1, the plate failed when the extruder power consumption (a measure of the back pressure on the die plate) was only a little over 3.6 kw. In Example 2, in which a thicker plate was used, failure occurred at power consumption of 4.4 kw. In Example 3, in which the plate thickness was the same as Example 2, but the improved die plate was used, failure did not occur at power consumption as high as 5.7 kw. The power consumption varied during the run because of changes in the temperature and viscosity of the feed.

It will be understood that various modifications and changes can be made in the configuration of the extended life die plate according to the present invention. The thickness of the die plate can be varied to affect the pressure drop through the die plate. A thicker die plate could be used with a less viscous material while keeping total pressure drop through the die plate the same. The shape of the holes through the die plate could be round, square, trapezoidal, polygon, oval, or any other desired configuration, with a resultant change in the shape of the strands of material extruded through the die plate. The spacing between the holes through the die plate can be varied as long as the holes in a transition area adjacent solid support sections of the die plate are spaced further apart than holes in a major portion of the perforated area separated from the solid support sections by the transition area. The solid support section of the die plate can be varied to conform to different extruder devices. While a center hub, radially extending spokes and outer rim configuration for the support section is shown, other configurations for the solid support section could include various grid patterns, or even just a simple square or circle without a center solid support area.

What is claimed is:

1. A die plate, comprising:
   a solid area; and
   a perforated area bordering on said solid area; said perforated area including a plurality of perforated sections separated from each other by said solid area; each of said perforated sections including a major area of holes through said die plate spaced from each other by first distances and a transition area surrounding said major area and separating said major area from said solid area and having holes through said die plate spaced from each other by second distances greater than said first distances.

2. The die plate according to claim 1, wherein said holes in said major area and said holes in said transition area are approximately equal in diameter.

3. The die plate according to claim 2, wherein said first distances are all approximately equal to each other and said second distances are all approximately equal to each other.

4. The die plate according to claim 3, wherein said holes in said major area and said holes in said transition area are approximately 0.027 inch in diameter.

5. The die plate according to claim 4, wherein said first distances are approximately equal to 0.04 inch and said second distances are approximately equal to 0.06 inch.

6. The die plate according to claim 5, wherein said die plate is approximately 0.04 inch thick.

7. The die plate according to claim 6, wherein said holes in said transition area are arranged in at least 3 rows around the outer periphery of said major area.

8. A die plate, comprising:

a solid, supporting section; and a perforated, extruding section having holes therethrough for passing a viscous material, said perforated section including a plurality of smaller perforated, extruding subsections separated from each other by said solid, supporting section and each having a major area of holes spaced from each other by first distances and a transition area of holes surrounding said major area and separating said major area of holes and said solid, supporting section, with said holes in said transition area being spaced from each other by second distances greater than said first distances.

9. The die plate according to claim 8, wherein said first distances are all approximately equal to each other and said second distances are all approximately equal to each other.

10. The die plate according to claim 9, wherein said holes through said die plate are all approximately the same internal diameter.

11. The die plate according to claim 10, wherein said holes through said die plate are approximately 0.027 inch in diameter.

12. The die plate according to claim 11, wherein said first distances are approximately 0.04 inch and said second distances are approximately 0.06 inch.

13. The die plate according to claim 12, wherein said holes in said transition areas are arranged in at least 3 rows around the outer peripheries of said major areas.

14. The die plate according to claim 13, wherein said die plate is approximately 0.04 inch thick.

15. A die plate, comprising:

a plurality of perforated sections;

said perforated sections being separated by solid sections;

each of said perforated sections having a transition portion around the entire perimeter of the perforated section with said transition portion having holes therethrough that are spaced from each other by greater distances than the spacing between holes in a central portion of the perforated section.

16. The die plate according to claim 15, wherein said transition portions have holes therethrough that are substantially the same diameter as the holes in the central portions of the perforated sections.

17. The die plate according to claim 16, wherein said solid sections include a solid central hub section, said solid central hub section being connected to radially extending solid spoke sections, and said radially extending solid spoke sections being connected to an outer solid rim section, with said perforated sections being positioned between said solid central hub section, said radially extending solid spoke sections, and said outer solid rim section.

18. The die plate according to claim 17, wherein said holes in said transition portions are spaced from each other by approximately 0.06 inch from center-to-center.

19. The die plate according to claim 18, wherein said holes in said central portions are spaced from each other by approximately 0.04 inch from center-to-center.

* * * * *